United States Patent [19]
Forrester et al.

[11] Patent Number: 5,867,624
[45] Date of Patent: Feb. 2, 1999

[54] METHOD AND APPARATUS FOR STORING SURPLUS ADSS CABLE

[76] Inventors: Joseph H. Forrester, P.O. Box 505, Buford, Ga. 30515; David E. Colley, 1715 Ozora Rd., Loganville, Ga. 30052

[21] Appl. No.: 900,840
[22] Filed: Jul. 25, 1997
[51] Int. Cl.[6] .................................................. G02B 6/00
[52] U.S. Cl. ............................................ 385/134; 385/100
[58] Field of Search .................................. 385/134–137, 385/147, 100, 101, 109

[56] References Cited

U.S. PATENT DOCUMENTS

| | | | |
|---|---|---|---|
| 4,762,583 | 8/1988 | Kaempen | 156/173 |
| 4,775,563 | 10/1988 | Kaempen | 428/36.3 |
| 4,786,536 | 11/1988 | Kaempen | 428/36.3 |
| 5,092,663 | 3/1992 | Hivner | 385/100 |
| 5,408,571 | 4/1995 | Kaplan | 385/135 |

*Primary Examiner*—Akm E. Ullah
*Attorney, Agent, or Firm*—Shoemaker and Mattare, Ltd.

[57] ABSTRACT

A method of storing surplus ADSS cable includes steps of laying out a length of cable along an aerial route defined by a series of poles and forming loops of surplus cable at occasional poles. The cable is raised to a predetermined installation height at each pole. Two dead-ends at the pole secure the ends of the loop so that the loop is substantially free of tension. The center of the loop is raised and secured to the pole while maintaining the minimum bend radius, thus forming two bights in the loop. A bend radius protector is installed in each of the bights to protect the cable. Each bend radius protector is suspended from a cable protecting sleeve placed over the taut cable, so that the cable is not damaged. An apparatus for practicing the method is also disclosed.

15 Claims, 11 Drawing Sheets

METHOD AND APPARATUS FOR STORING SURPLUS ADSS CABLE

BACKGROUND OF THE INVENTION

This invention relates to the art of data transmission and more particularly to a method and apparatus for storing surplus ADSS cable along an aerial route. ADSS is an acronym for "all-dielectric self-supporting". Such cable has a strong non-metallic sheath which supports the optical fibers making up the cable. ADSS cable may also have a reinforcing strand at its core. All-dielectric cable has the advantage that it can be used in close proximity to electrical power lines, whereas conventional communications cable are required to be run in a separate zone, usually at least forty inches below the power cables.

Optical cable is vulnerable to damage (fiber breakage) from bending and twisting, and performs best when sag and twisting are minimized. Cable manufacturers specify a minimum bend radius which must be strictly observed to avoid fiber damage. Currently, as a rule of thumb, the bend radius cannot be less than ten times the cable diameter for an unstressed cable, fifteen times the diameter for a stressed cable. This rule of thumb may change as cable construction changes; the trend appears to be toward cables having smaller minimum bend radii. In any event, devices used to store surplus cable, must protect the cable from bending too sharply, that is, at less than the specified minimum bend radius.

Fiber optic cable is typically installed on aerial routes in very long lengths so as to minimize the number of splices, each of which degrades optical signals. To allow for rerouting, such as pole movement, and for repairs, it is important to provide slack in the form of surplus lengths of cable at intervals along the route, so that entire long lengths of cable do not have to be taken down when minor repair or rerouting is required. The more frequent the storage interval, the less the probable length of cable which must be rehung if rerouting is necessary. The surplus cable may be stored either below ground, or along the aerial route.

In the underground storage method, the cable is routed from its aerial attachment location down a pole and into an underground enclosure. The cable is coiled within the enclosure, and then routed back up the pole to continue along the main cable route. This method is presently the predominantly accepted method for storing surplus ADSS cable, but it is has several disadvantages.

First, underground storage requires an expensive, watertight, underground enclosure and necessitates the expense of excavation. Moreover, an unobstructed excavation site is not always available at the exact pole location where the cable must be stored.

Second, an enclosure sometimes does not provide sufficient space to store the required length of cable in a manner that renders the cable easy to access and manage when access is necessary. If the pole has to be relocated subsequently, there is an additional moving expense of excavation at the new pole site to install the container.

Third, the fact that the cable must be routed up and down the pole from the aerial attachment location to the underground enclosure makes the cable vulnerable to damage from collisions (e.g., auto accidents, being struck by mowers, etc.) and from vandalism. Any such damage to ADSS cable would require potentially extensive and costly cable replacement attended by unacceptable loss of service. Clearly, an aerial method of storing ADSS cable would avoid the drawbacks of the underground storage method just described.

For aerial storage, it has been proposed to run surplus optical cable around snowshoe or teardrop shaped devices to avoid overbending. Prior U.S. Pat. No. 5,092,663 (Hivner) and 5,408,517 (Kaplan) exemplify prior devices. These devices, however, were designed for pre-ADSS fiber optic cable, which does not have sufficient strength to support itself, and must be lashed to or otherwise supported from a steel or metallic messenger cable. While prior inventions are acceptable for storing messenger-supported fiber optic cable, no provision has been offered which would make such inventions suitable for use with ADSS cable, which must be protected at all times not only from overbending, but also from incidental contact and abrasion.

In the installation of messenger-supported fiber optic cable, attachments of any necessary hardware such as that described in the patents mentioned above may be made directly to the steel messenger cable without any danger of damaging the fiber optic cable. In the case of ADSS cable, however, the supporting member is the outer sheath of the cable, which is subject to possible damage if any attachment which is not properly designed is made directly to the cable.

A problem related to that of surplus cable storage is that of supporting splices between cables. Splicing is usually done at ground level in a truck or trailer containing special splicing apparatus. Therefore, enough excess cable must be provided at the splice so that it can reach the ground. Additionally, once the splice has been made, it is secured in a box known as a "splice closure", which may weigh as much as 35 pounds. Because of their weight, such closures have been mounted on the pole in the past, but this creates a confusion of cables near the pole, where they might be damaged, and without any guarantee of minimum bend radius protection. It would be better to support the splice box from the cable, if one could avoid injuring the cable.

SUMMARY OF THE INVENTION

An object of the invention is to provide an above-ground method of storing surplus ADSS cable along an aerial route.

Another object of the invention is to permit such a method to be practiced at any height above the ground, so as to avoid other utility attachments. A related object is to enable communications cables to be installed in the power zone on a utility pole.

A further object of the invention is to protect fiber optic cable from damage by being struck by automobiles, mowing equipment and the like.

Yet another object is to facilitate access to stored cable when necessary.

An additional object of the invention is to provide a method and apparatus for storing a sufficient length of surplus ADSS cable so that the cable may be conveniently and safely relocated to a vehicle at ground level for splicing operations, and then conveniently restored to the aerial storage location once splicing is completed. A related object is to facilitate relocating a pole supporting the cable, when necessary.

Another object of the invention is to provide means for storing ADSS cable which does not itself endanger the integrity of the cable.

Yet another object is to permit the storage of an unlimited length of surplus ADSS cable.

One further object is to provide a method and apparatus for storing surplus ADSS cable in a manner which is economical of materials and labor.

One other object of the invention is to provide a way of installing a splice closure at a surplus loop installation location.

These and other objects are attained by an apparatus for storing a surplus length of ADSS cable on a pole. The apparatus includes a pair of dead ends, each connecting to the pole, for relieving line tension so that the surplus length is not under tension, a pair of snowshoe-shaped bend radius protectors for supporting opposed ends of a loop of surplus cable, on the main part of the cable which is under tension, a pole-mounted multiple cable guide for supporting the ends and the middle of the loop and to protect the cable as it passes the pole, and a pair of cable protection sleeves, one attached to each of the radius protectors, for suspending the protectors from the main line under tension. In one embodiment of the invention, cable splice closures are aerially supported as well.

The invention also provides methods of storing and splicing optical cable, using the inventive apparatus.

BRIEF DESCRIPTION OF THE DRAWINGS

In the accompanying drawings.

DESCRIPTION OF THE PREFERRED EMBODIMENTS

Figure 1:
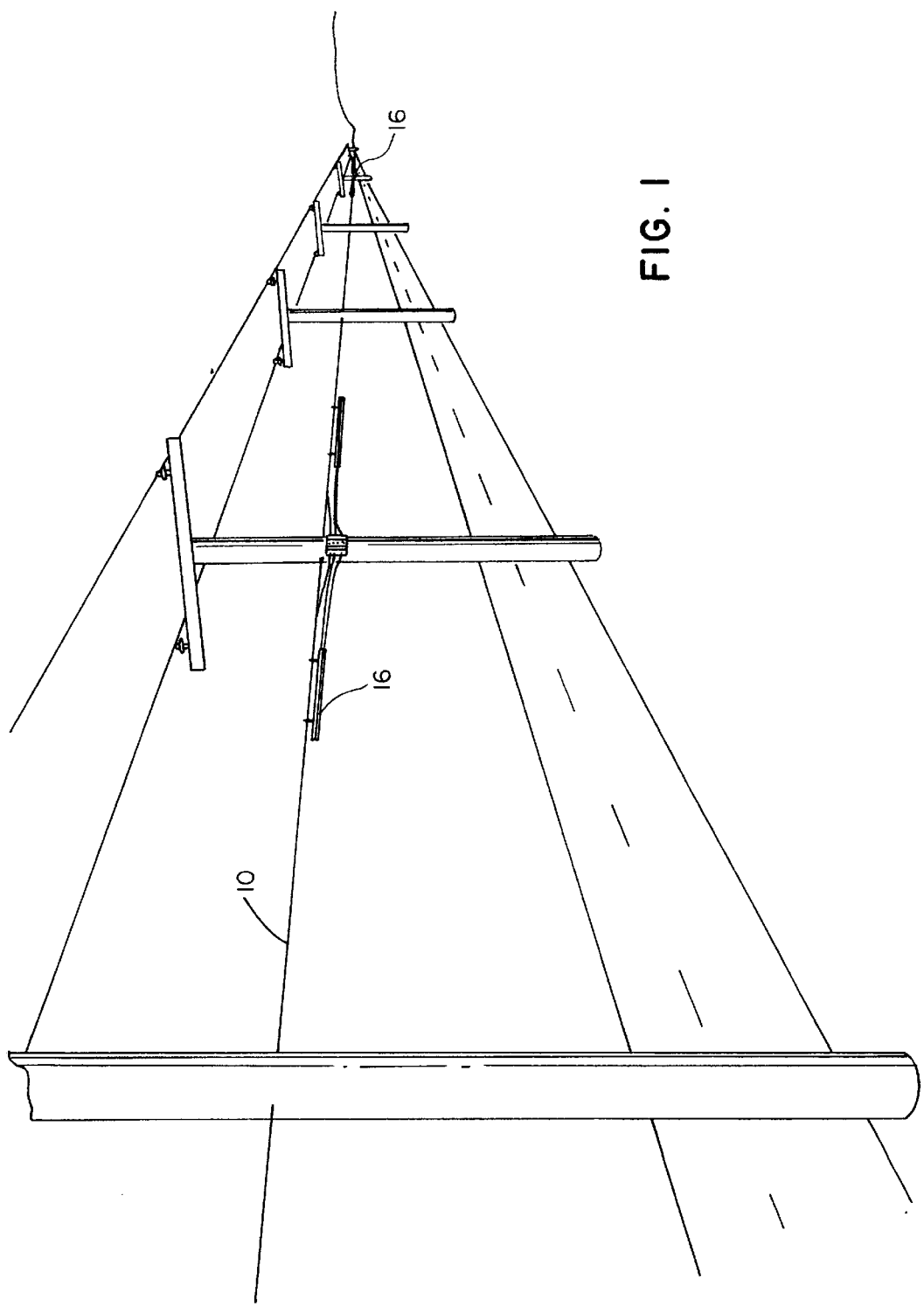
FIG. 1 is a perspective view of an aerial installation of optical cable supported by a series of poles.

An all-dielectric self-supporting optical cable installation is shown in FIG. 1. A series of poles P inserted in the ground at possibly uneven intervals define an aerial route. An ADSS optical cable thousands of feet long is installed at a specified installation height above the ground along the poles, and surplus lengths of cable are laid out at some of the poles (about four or five loops per mile). Each loop may have a length of a hundred feet, more or less, to allow for pole relocations and to provide enough cable to reach a splicing truck, if necessary. The poles other than those at which the loops are laid out have conventional cable-supporting hardware.

Figure 2:
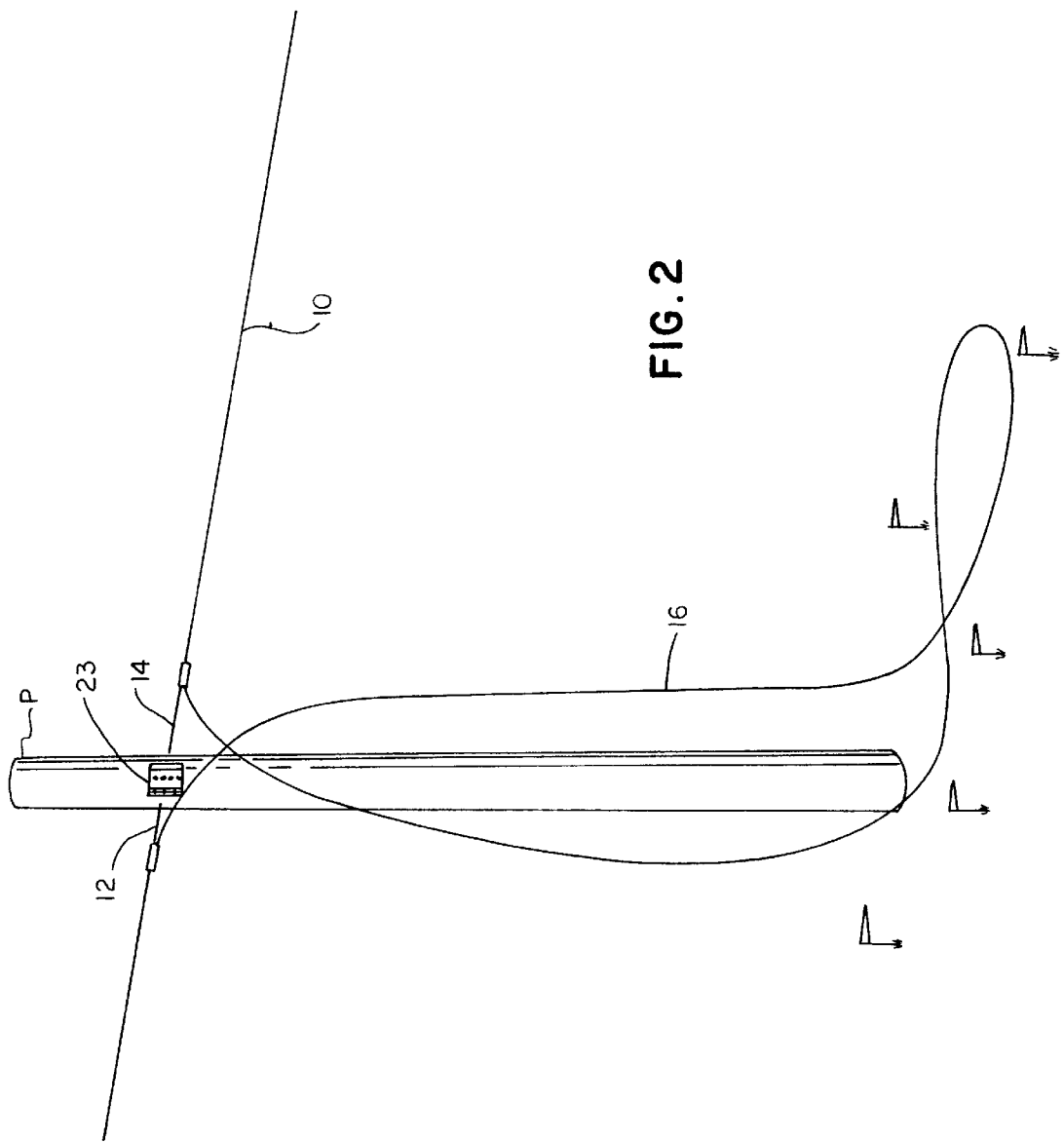
FIG. 2 is an enlarged view corresponding to a portion of FIG. 1, showing a single pole and a surplus loop of ADSS cable laid out adjacent the pole.

One of the loop-supporting poles is shown in greater detail in FIG. 2. Here, the taut cable 10 extends in either direction from the pole, and is maintained under tension by two dead-ends 12, 14 which grasp the cable and transfer its tension to the pole, so that the loop 16 of surplus cable is substantially tension-free. Markers are laid out around the loop to protect it from accidental damage.

A dead-end (FIG. 5) is a piece of hardware which grips the cable passing through it like a Chinese finger trap. It comprises two or more layers of wires 18 wrapped around the cable in helical fashion; alternating layers have opposite hand. The proximal end of the wires are formed into a loop 20 which is attached to the clevis at one end of a rigid link 22, the other end of which is secured to the pole.

Figure 6:
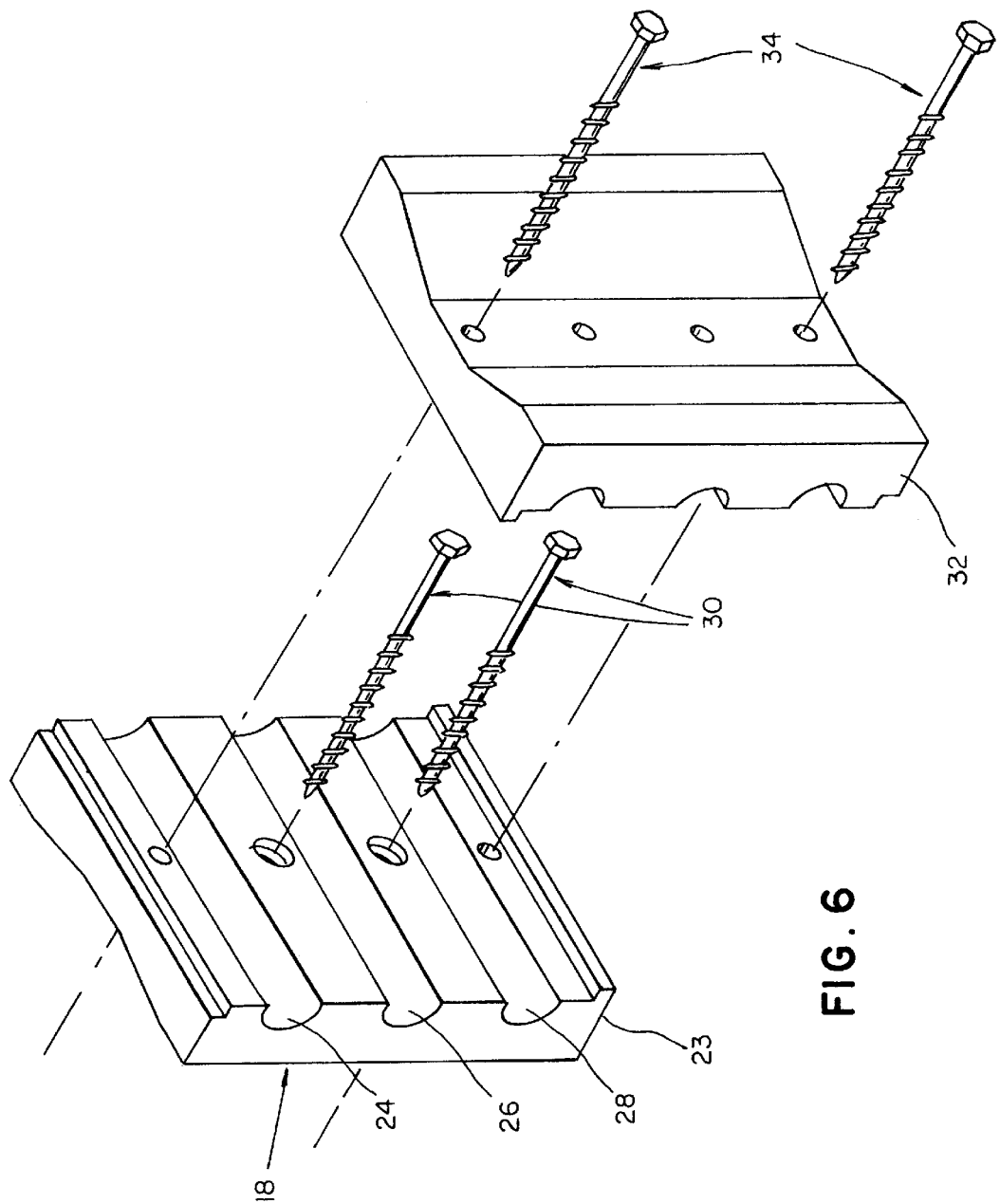
FIG. 6 is an exploded detail view of a cable guide attached to a pole, between two dead-ends.

In FIG. 2, the base 23 of a cable guide, having three channels 24, 26, 28, has been attached to the pole by two lag screws 30. See FIG. 6 for a detail.

Figure 3:
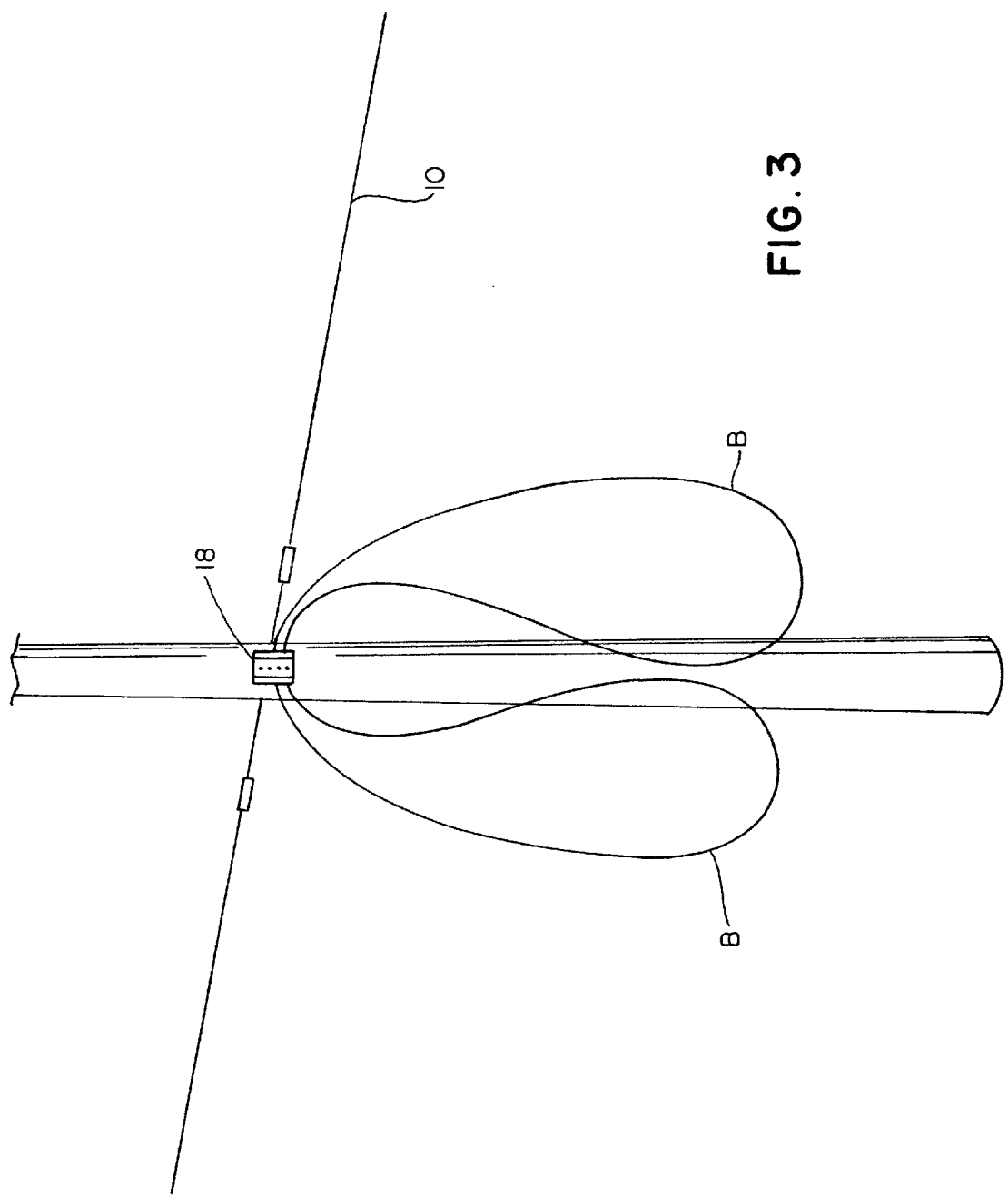
FIG. 3 is a view like FIG. 2, showing the center of the loop raised to the level of the cable.

In FIG. 3, a worker has laid the two ends of the loop in the upper two channels of the guide base, and has raised the center of the loop from the ground, placing it in the bottom channel, while taking care not to bend the cable beyond its minimum bend radius. The guide cap 32 (FIG. 6) has been placed over the cables, and lag screws 34 are driven through holes in both blocks, into the pole. The free ends of the loop now form bights "B" which hang down from the pole.

Figure 4:
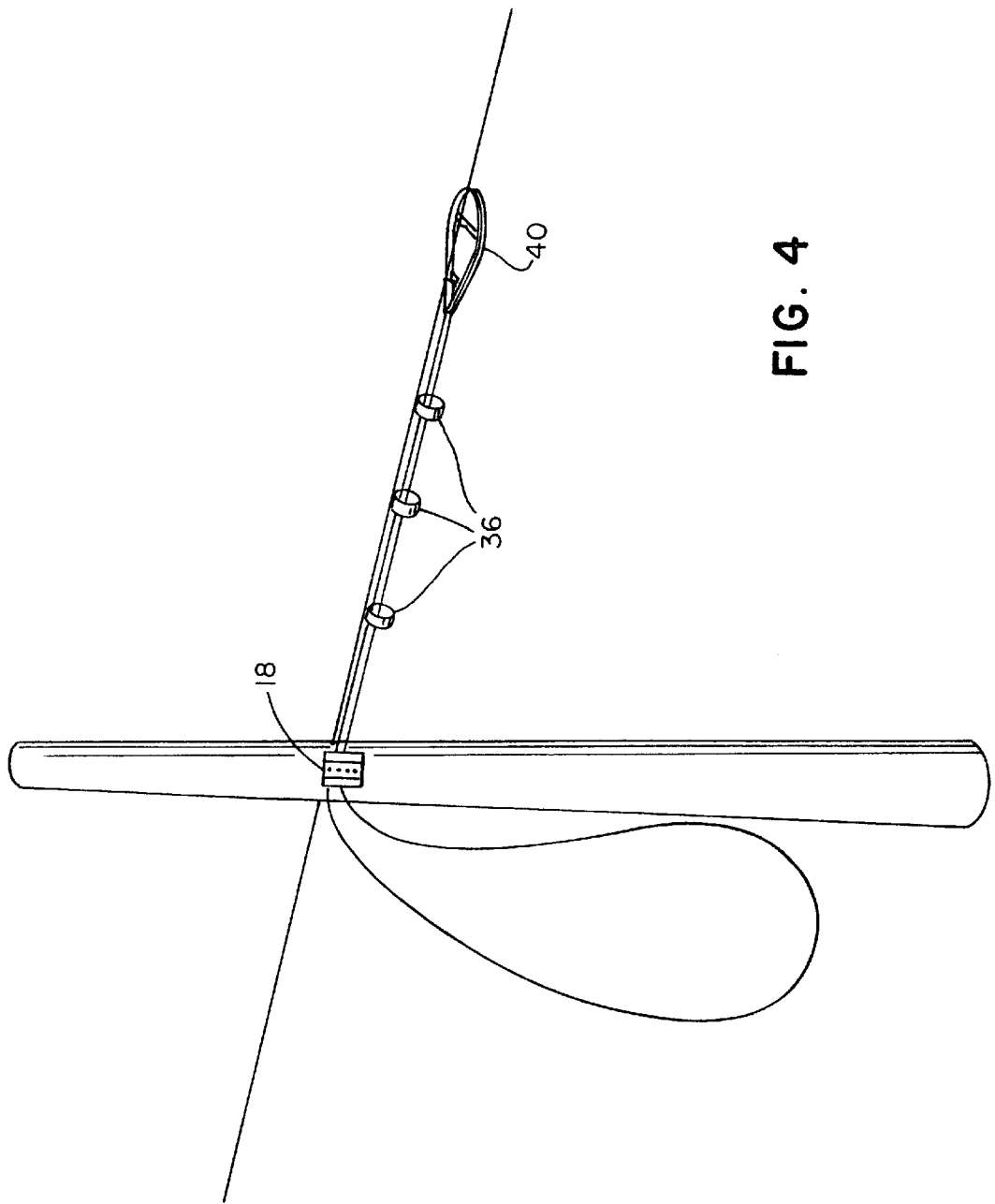
FIG. 4 is a view like FIG. 3, showing one bight of the loop supported according to the invention.

Next, the bights are raised (one at a time) and bound to the taut cable by hardware such as bands 36 (FIG. 4), working outward from the pole. Taking care to maintain bend radius above the minimum, the worker lastly installs a bend radius protector 40 at the ends of each bight, and suspends the protector from the taught cable, clamping over a cable protecting sleeve 50 (FIG. 5) which he has placed on the cable. The sleeve (see FIG. 7) comprises, like the dead-ends, an array of wires which wind helically around the cable, protecting it from abrasion and crimping damage.

Figure 8:
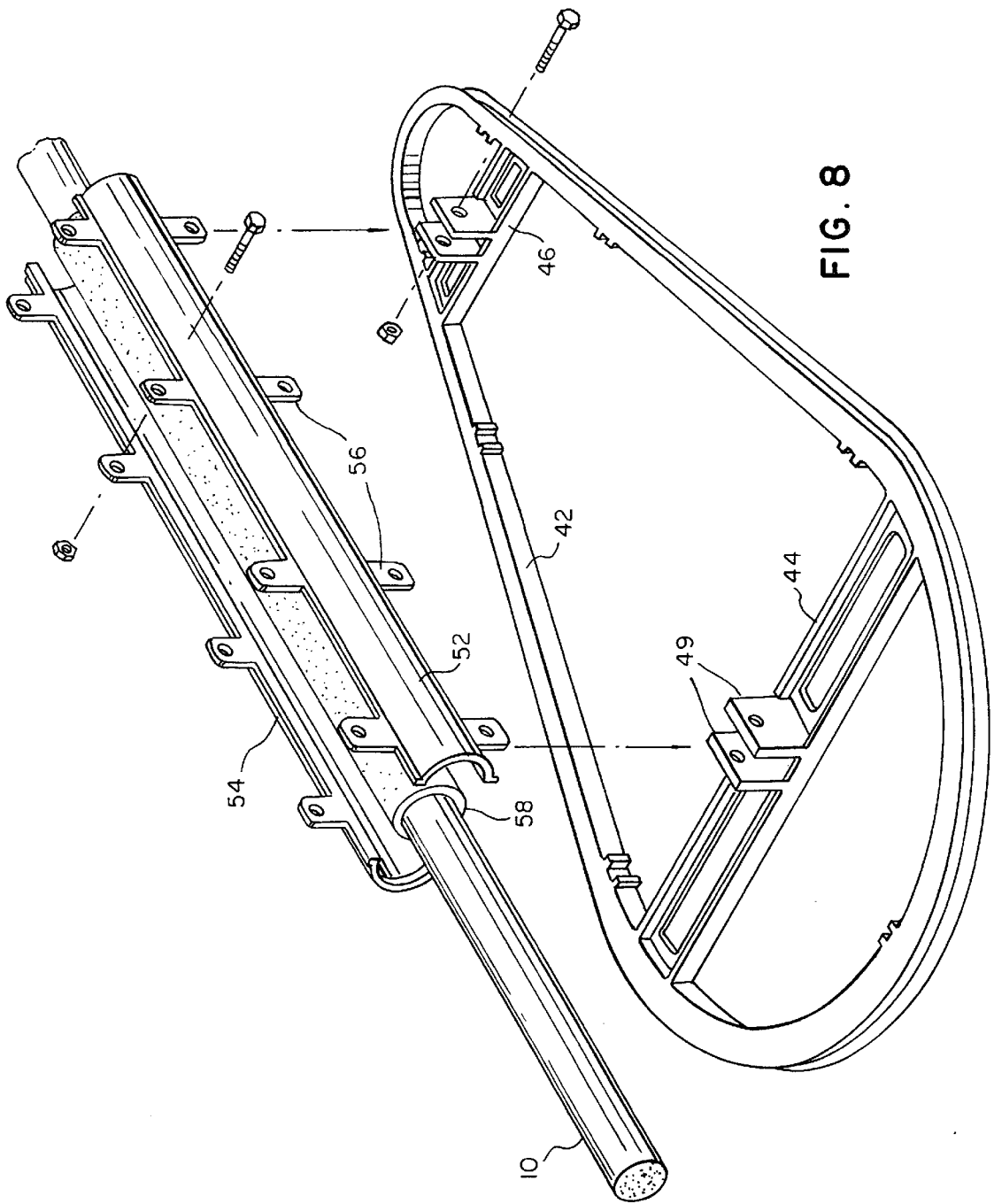
FIG. 8 is an exploded view of an alternate, non-conductive bend radius protector, suspended from a non-metallic cable protecting sleeve.

Alternatively, the sleeve may be formed (FIG. 8) of two plastic half-shells 52,54 bolted together around the cable. The tabs 56 shown receive clamping bolts, and two of the outermost provide means for suspending the bend radius protector. A hard foam bushing 58 is placed between the shells and the cable, lightly clamping it, to prevent the radius protector from swaying. Bushings of different inside diameters may be provided to accommodate cables of different size.

Figure 7:
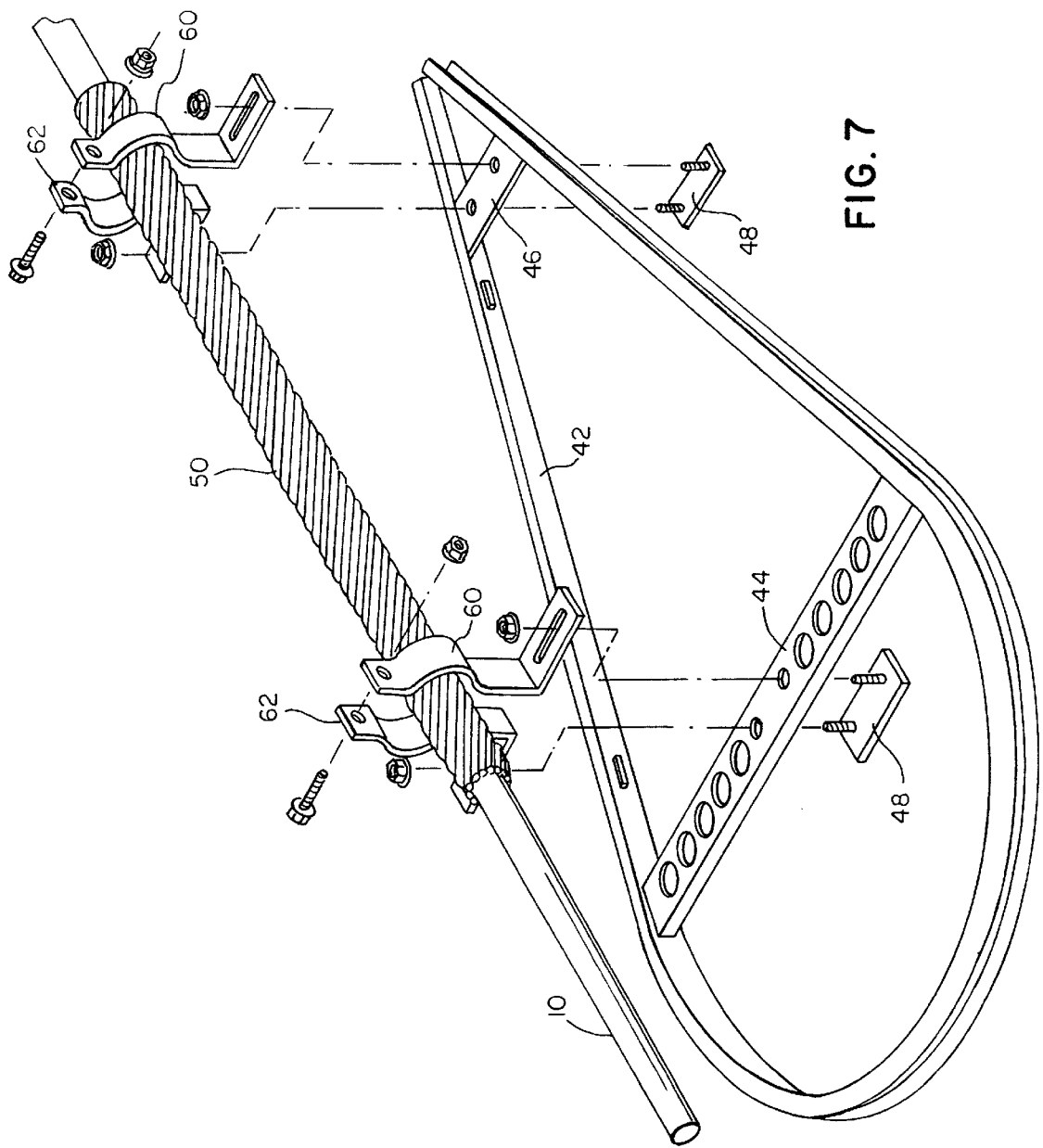
FIG. 7 is an exploded view of an aluminum bend radius protector suspended from a metallic cable protecting sleeve.

If the protecting sleeve of FIG. 7 is used, the bend radius protector is suspended from it by means of a two clamps, each comprising two halves 60,62 which are bolted together around the protecting sleeve; the clamps are in turn secured to the cross-braces by means of stud plates and nuts, as shown in FIG. 7.

The bend radius protector 40 is a metallic (FIG. 7) or plastic (FIG. 8) device having the shape of a snowshoe. The periphery of the device is formed by a channel member 42 arranged groove outward (alternatively, the groove could face perpendicular to the plane of the device). The groove preferably is half-round, of a radius like that of the largest contemplated cable. The channel is reinforced by front and rear cross-braces 44,46 which also provide means for suspending the protector. In the metallic version (FIG. 7), the cross braces have a pair of holes for receiving studs on a stud plate 48 which is installed from the bottom so that the studs protrude through the holes, and the clamps can be installed over them. In the plastic version (FIG. 8), pairs of tabs 49 are molded onto the upper surfaces of the crossbraces, and the appropriate tabs of the two-piece protecting sleeve are installed between the tabs, and secured by through-bolts.

While metallic bend radius protectors have the advantage of being easy to manufacture, it is expected that bend radius protectors made entirely of plastic will become preferred for reasons of cost and safety. Which plastic material may be selected eventually is not now known. We contemplate that a strong structural foam, possibly a skinned foam, may be most preferred.

Utility poles commonly carry power lines in a power transmission zone at the top of the poles, and telephone lines in a communications zone below the power transmission zone. A radius protector made of metal may be appropriate in the communications zone (lower on the pole); however, a plastic unit should be used if the cable is run in the power transmission zone, for worker safety and to avoid other problems of induced voltage.

Directions for installing a cable according to this invention follow.

Initially, evaluate of the route must be performed to establish at which locations (i.e., poles) the surplus cable should be installed. All such pole locations, along with the corresponding surplus loop lengths, should be indicated on the final project plans furnished to the installation crew. Each pole where a surplus cable loop is to be installed should be marked to identify the location of a surplus loop point prior to, or ahead of, the installation of the main cable route by the installation crew.

At the first surplus loop location, dead-end the ADSS cable using approved dead-end hardware at the proper attachment height on the pole.

After the first dead-end is properly secured, remove the predetermined length of surplus ADSS cable from the spool. Lay out one fourth of the total surplus cable length ahead in the direction of the main cable run, then loop back toward the dead-end pole. Continue to lay out cable past the pole to a point one fourth of the total surplus loop length in the opposite direction, then loop back and return the dead-end pole.

Raise the end of the total length of the surplus cable loop to the proper attachment height and dead-end the cable in the opposite direction from the first dead-end attachment.

The entire length of the surplus loop is now independent of the main cable run and should be laid out directly under the main, overhead cable with one-half of the surplus loop ahead of the pole and the remaining one-half of the loop rearward. Place the appropriate protection and caution markers at the location of the surplus loop to prevent damage to the cable.

Continue to install the main ADSS cable route along the pole line to the next surplus cable pole location and repeat the dead-end and layout procedure described above.

At the proper attachment height, install one half of the cable guide to the pole, using two lag screws inserted through the countersunk holes at the center of the unit. Drive the lag screws into the pole so that the heads are flush with the mating surface of the unit, but do not over-tighten.

To install a surplus loop on the pole, locate the mid-point of the loop and raise it to the multiple cable guide. Position the beginning section of the cable loop into the top cable channel, the ending section into the middle cable channel, and the mid section of the loop into the bottom channel.

With all three cable sections properly positioned, install the second half of the multiple cable guide over the cables and secure it using the two remaining lag screws. Apply only enough torque to draw the two halves of the unit together. Use caution not to bind any portion of the cable between the two halves of the multiple cable guide during installation.

After the mid-portion of the loop is properly secured to the pole, begin raising short sections of the forward or rearward half of the loop to the main cable run and secure the two loop sections to the main cable using mid-span cable clamps or tie wraps. Continue to raise and attach the cable loop until the end of the loop half is reached, leaving enough of the loop end free so that it can be installed onto a bend radius protector.

Now, install one cable protection sleeve onto the maid cable at the location of the first bend radius protector. The cable protection sleeve is installed by wrapping the spiral rod sections around the cable until the entire section of cable is enclosed in the complete cable protection sleeve. Using the end of the cable loop section as a guide, make sure that the cable protection sleeve is positioned on the cable in a manner that will allow the sleeve clamps or bend radius protector mounting tabs (which will support the bend radius protector) to attach directly to the cable protection sleeve.

Install the end loop of the surplus cable into the channel of the bend radius protector to attach directly to the cable protection sleeve.

Install the end loop of the surplus cable into the channel of the bend radius protector and secure it at the proper locations around the channel using cable ties.

Slide the two halves of each sleeve clamp assembly apart and position the front and rear clamp assemblies around the armor rod. Next, slide the two clamp halves of each clamp armor rod. Next, slide the two clamp halves of each clamp assembly together and tighten the nuts located on the stud plates. Install a bolt through the top hole of each clamp and secure the clamps using nuts. Avoid using excessive force, which may distort the armor rod assembly and possibly damage the cable.

Repeat the preceding four steps to install the remaining half of the surplus loop, armor rod assembly, and bend radius protector.

Figure 9:
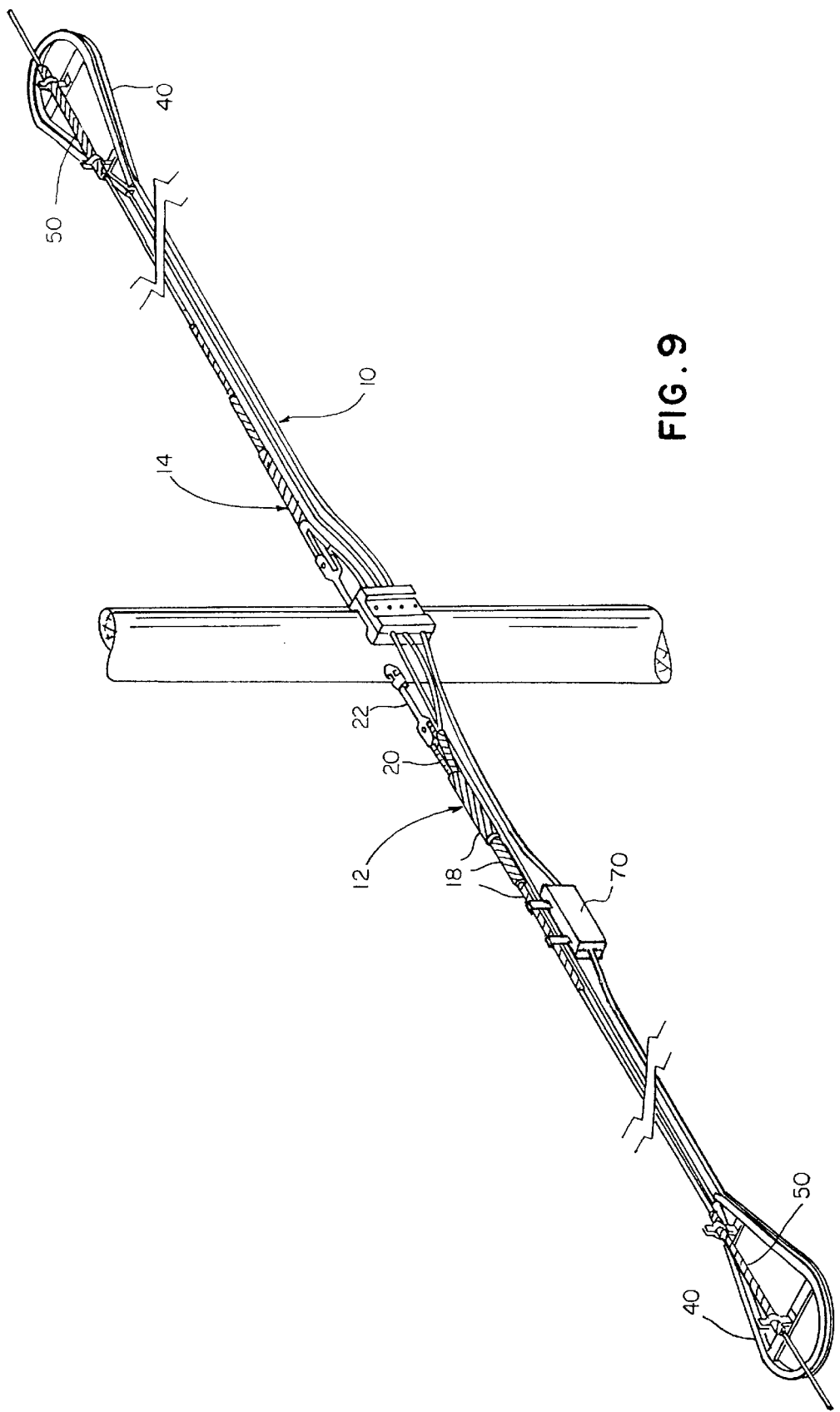
FIG. 9 is an exploded view of an inline splice closure box hung from one of the dead-ends.
Figure 10:
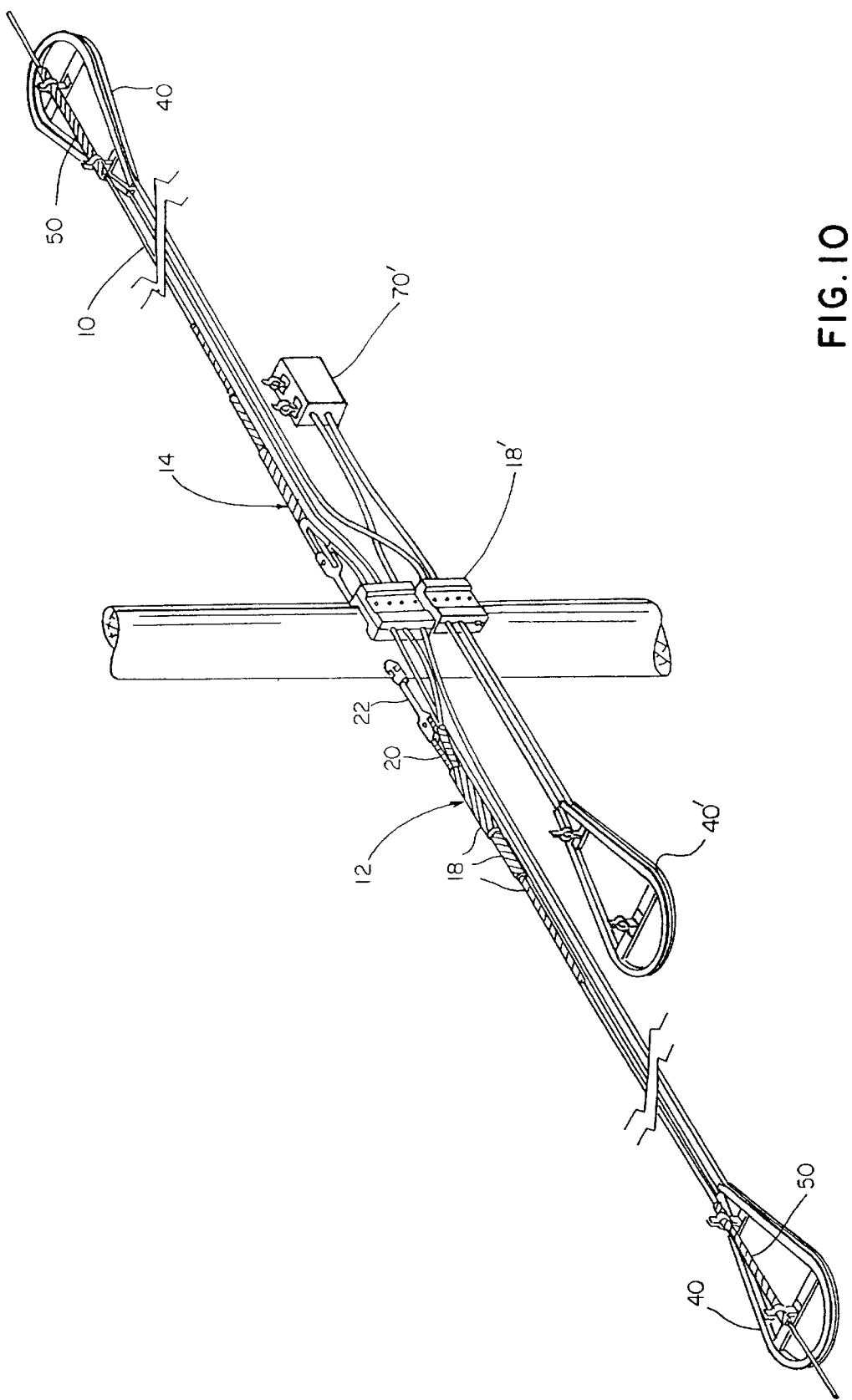
FIG. 10 shows a butt splice installation.

FIGS. 9 and 10 show splice closures supported from an aerial cable according to the invention. In FIG. 9, two cables are joined end-to-end in an inline splice. In FIG. 10, a butt splice has been formed between two cables whose ends pass in the same direction into a closure.

Figure 5:
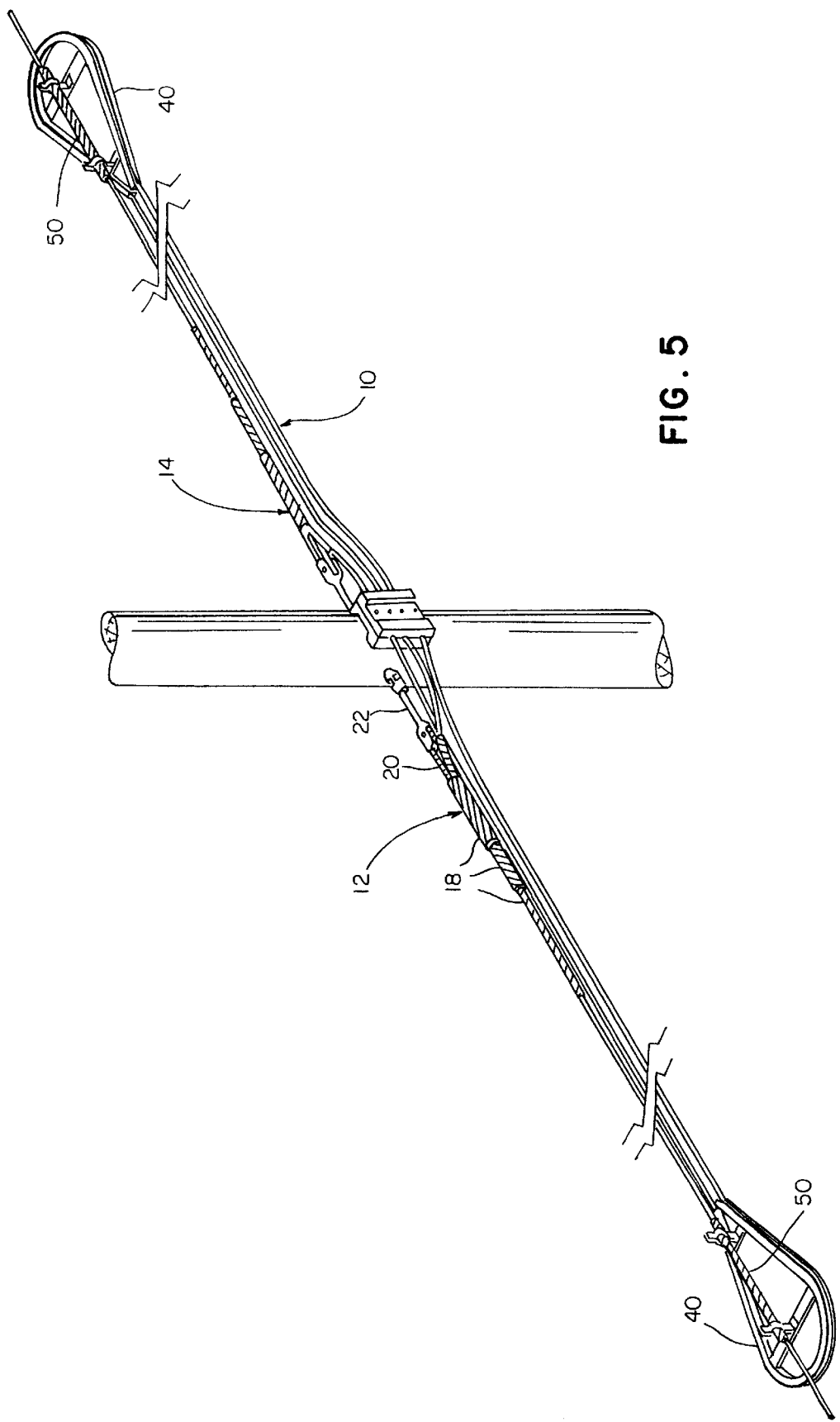
FIG. 5 shows the loop at the end of installation.

In FIG. 9, an inline splice closure 70 has been added to the arrangement shown in FIG. 5. The closure contains an end-to-end cable splice formed at ground level and secured in the closure, which has been subsequently suspended from the dead-end 12 by clamps like those shown in FIG. 7.

Figure 11:
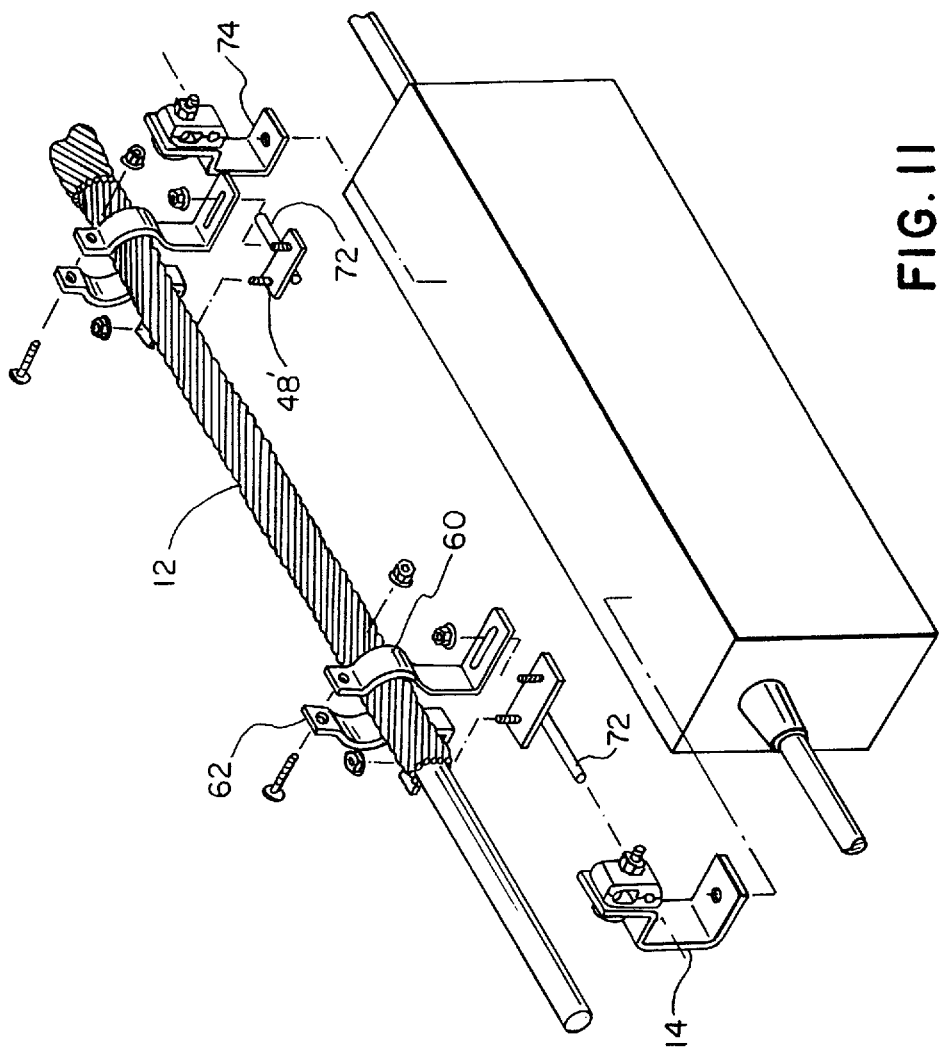
FIG. 11 shows details of hardware for suspending a splice closure from a dead-end.

FIG. 11 shows the clamps in greater detail. Each clamp has two parts 60,62 that are bolted together around the dead-end 12. Note that each stud plate has been modified by welding a horizontal rod 72 to one side. The stud plates 48' are installed with their respective rods facing away from one another so as to simulate a cable messenger. Now, standard suspension hardware 74 provided by the closure manufacturer, intended for messenger-type cables, can be hung from the simulated "messenger". This suspension arrangement is suitable for butt-splice closures as well.

In FIG. 10, a butt-type splice has been formed, and the splice closure 70' is about to be hung from the dead-end 14, by means of clamps similar to those shown in FIG. 7. If it is not possible to locate the closure beneath the dead-end, a cable protection sleeve may be placed around the cable beyond the dead-end, and the closure then is hung from the sleeve. Either way, the cable routing is more complex, and a second multiple cable guide and a third bend radius protector are required. The second guide 18' is installed just below the original guide, and the third bend radius protector 40' is suspended from the dead-end on the opposite side of the pole. The routing of the surplus cable is as follows: from the left dead-end, through the middle channel of the cable guide, around the right bend radius protector, back through the top channel of the second cable guide to the third bend radius protector, then back through the middle channel of the second cable guide to the splice closure. The succeeding cable emerges from the splice closure, passes through the bottom channel of the top cable guide, around the left bend radius protector, and back through the top channel of the top cable guide to the right dead-end. Obviously, which channels are used is not critical, but the routing specified avoids confusion. One might, of course, use a single cable guide with five or more channels instead of the two described.

If a cable splice is required during installation of a surplus loop, the following procedure should be followed:

The splice (either an in-line splice or a butt splice) should be located so at a point along the surplus loop that will allow the splice closure to be installed onto the smallest wire wrap of one dead-end assembly (approximately five to six feet from the mid-point of the surplus loop).

If the splice is to be made relative to a cable reel end, make sure that there is a sufficient length of cable on the end of the reel at the pole location to make a complete forward one-half loop of surplus cable beyond the pole and that the return end of the cable will fall within five to six feet of the pole.

With the main cable dead-ended in both direction, the splice closure complete, and the surplus loop laid out properly, raise the splice closure to the proper dead-end and attach the splice closure to the smallest wire wrap of the dead-end assembly using two splice closure installation clamp assemblies.

A butt splice may also be located along the surplus loop length of cable either at the end of a cable reel, or at any point along the cable installation. An additional bend radius protector and one additional pole guide assembly is required for a butt-type splice. FIG. 10 shows the proper cable routing.

Repeat the previously described procedure, raising and supporting the remaining half of the surplus loop in the opposite direction.

Install one cable protection sleeve around the main cable at each location where a bend radius protector is to be installed. Using the unsupported end of the loop as a guide, locate the cable protection sleeve so that each end of the sleeve will align as closely as possible with each end of the bend radius protector when the bracket is in its final installed position. This will allow for any minor adjustments in the location of the radius protector which may have to be made to remove slack from surplus cable.

Fit two hanger brackets to each bend radius protector, if support brackets are not pre-formed on the bend radius protector.

Place the unsupported loop end of one section of surplus cable into the snowshoe channel and secure the cable in the channel with tie-straps.

An in-line splice closure may be located along the surplus loop of cable either at the end of a cable reel, or at any point along the cable installation.

To install a surplus loop and a splice closure where the surplus loop does not represent the end of the reel cable: First, with the main run of cable properly dead-ended in both directions and the surplus loop ready for installation to its aerial location, identify a point on the surplus loop approximately five to six feet from the mid-point of the surplus loop in either direction from the pole. Make the required splice at this point and install the appropriate splice closure onto the cable. Next, raise the splice closure to the attachment height of the dead-end closest to the splice point and attach the splice closure directly to the smallest diameter wire wrap of the dead-end assembly using splice closure installation brackets. After the splice closure is properly secured to the dead-end, install the multiple cable guide and secure the three sections roof the surplus loop as described above. Continue with the surplus loop installation procedure described above until the entire surplus loop is properly adjusted and secure.

To install a surplus loop and a splice closure where the splice closure will be located near the end of a cable reel: First insure that there is a sufficient length of cable on the end of the reel to make a complete forward loop beyond the pole (i.e., 25 feet ahead and 25 feet back) with the end of the cable falling within five to six feet from the pole.

Since the invention is subject to modifications and variations, it is intended that the foregoing description and the accompanying drawings shall be interpreted as only illustrative of the invention defined by the following claims.

We claim:

1. An apparatus for storing surplus ADSS cable having a specified minimum bend radius, said apparatus comprising a pair of dead-ends for relieving cable tension at either end of a surplus loop of cable formed at a pole, so that the loop is substantially free of tension, a pair of bend radius protectors for maintaining at least the minimum bend radius at two bights formed in the loop when the center of the loop is raised to cable height, a pair of cable protecting sleeves, each mounted on the cable above the respective bend radius protectors, and means for suspending the bend radius protectors from the respective sleeves.

2. The invention of claim 1, further comprising a cable guide mounted on the pole, said guide having channels for supporting the beginning of the loop, the end of the loop, and the middle of the loop.

3. The invention of claim 2, wherein the cable guide comprises a base and means for attaching the base to the pole, and a cap and means for attaching the cap over the base, said channels being formed by mating grooves in the cap and base.

4. The invention of claim 1, wherein the cable protection sleeve comprises an array of wires wound helically around the taut cable.

5. The invention of claim 1, wherein the cable protection sleeve comprises a pair of mating half-shells installed on either side of the taught cable, and means for connecting the half shells to one another.

6. The invention of claim 5, further comprising a bushing made of a plastic foam, within the sleeve, for gripping the cable surface to prevent the bend radius protector from swaying on the cable.

7. The invention of claim 5, wherein the half-shells have tabs from which the bend radius protector can be suspended.

8. The invention of claim 1, wherein the bend radius protector comprises a channel member formed in a teardrop shape, the channel member having a longitudinal groove for receiving the cable.

9. The invention of claim 8, wherein one end of the teardrop shape has a radius at least ten times the diameter of the cable.

10. The invention of claim 8, wherein one end of the teardrop shape has a radius no less than the minimum bend radius specified by the cable manufacturer.

11. The invention of claim 8, wherein the channel member is reinforced by two cross-braces extending perpendicular to a plane of symmetry bisecting the teardrop shape.

12. The invention of claim 11, further comprising means on each cross-brace for connection to the cable protection sleeve.

13. The invention of claim 12, wherein the bend radius protector and the cable protection sleeve are made of a dielectric material.

14. A fiber optic cable installation comprising
- a series of poles installed in the ground and defining an aerial route at a specified cable installation height,
- a length of all-dielectric self-supporting cable supported by said poles at the installation height,
- a plurality of loops of surplus cable formed at intervals along said route, each loop being located at one of said poles,
- a pair of dead-ends defining the ends of each loop, said dead-ends being attached to the respective pole,
- means for supporting the center of the loop at the installation height on the pole, thus forming two bights of cable in the loop,
- a pair of bend radius protectors, one for each bight, and means for supporting the bend radius protectors from the taut cable, said means comprising a cable protecting sleeve installed over the taught cable above each said bend radius protector.

15. A method of storing surplus ADSS cable having a specified minimum bend radius, the method comprising steps of
- laying out a length of cable along an aerial route defined by a series of poles and forming loops of surplus cable at intervals, each said loop being at the location of one of said poles,
- raising the cable to a predetermined installation height at each of said poles, and securing the cable to the poles,
- at each loop location, affixing two dead-ends to the pole and securing the ends of the loop with the respective dead-ends so that the loop is substantially free of tension,
- raising the center of the loop to installation height and securing it to the pole while maintaining said minimum bend radius, thus forming two bights in the loop,
- installing a bend radius protector in each of the bights to protect the cable,
- installing a cable protecting sleeve over the main cable above each bend radius protector, and
- securing each bend radius protector only to a respective one of said sleeves.

* * * * *

UNITED STATES PATENT AND TRADEMARK OFFICE
CERTIFICATE OF CORRECTION

PATENT NO. : 5,867,624

DATED : February 2, 1999

INVENTOR(S) : Joseph H. Forrrester

It is certified that error appears in the above-identified patent and that said Letters Patent is hereby corrected as shown below:

Column 8,
Claim 1 insert --1. An apparatus for storing surplus ADSS cable having a specified minimum bend radius, said apparatus comprising a pair of dead-ends for relieving cable tension at either end of a surplus loop of cable formed at a pole, so that the loop is substantially free of tension, at least two bend radius protectors for maintaining at least the minimum bend radius at a corresponding number of bights formed in the loop when the center of the loop is raised to cable height, at least two cable protective devices, each mounted on the cable above the respective bend radius protectors, and means for suspending the bend radius protectors from the respective cable protection devices.--

Column 9,
Claim 14 insert --14. A fiber optic cable installation comprising a series of poles installed in the ground and defining an aerial route at a specified cable installation height, a length of all-dielectric self-supporting cable supported by said poles at the installation height,

UNITED STATES PATENT AND TRADEMARK OFFICE
CERTIFICATE OF CORRECTION

PATENT NO. : 5,867,624
DATED : February 2, 1999
INVENTOR(S) : Joseph H. Forrrester It is certified that error appears in the above-identified patent and that said Letters Patent is hereby corrected as shown below:

a plurality of loops of surplus cable formed at intervals along said route, each loop being located at one of said poles,
    a pair of dead-ends defining the ends of each loop, said dead-ends being attached to the respective pole,
    means for supporting the center of the loop at the installation height on the pole, thus forming at least two bights of cable in the loop
    a plurality of bend radius protectors, one for each bight, and
    means for supporting the bend radius protectors from the taut cable, said means comprising a cable protecting device installed over the taut cable above each said bend radius protector.--.

Signed and Sealed this

Fourth Day of July, 2000

Attest:

Q. TODD DICKINSON

*Attesting Officer*      *Director of Patents and Trademarks*